(12) United States Patent
D'Antonio et al.

(10) Patent No.: US 7,486,207 B2
(45) Date of Patent: Feb. 3, 2009

(54) METHOD AND DEVICE FOR CHANGING AN ENCODING MODE OF ENCODED DATA STREAMS

(75) Inventors: Luigi D'Antonio, Rome (IT); Andrea Ambrosioni, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 547 days.

(21) Appl. No.: 11/275,041

(22) Filed: Dec. 5, 2005

(65) Prior Publication Data

US 2006/0159185 A1    Jul. 20, 2006

(51) Int. Cl.
*H03M 7/34* (2006.01)

(52) U.S. Cl. .................. 341/51; 341/55; 341/60; 341/61; 341/82; 341/107; 375/240.12; 375/240.16; 375/240.23; 375/240.25; 375/240.03

(58) Field of Classification Search .......... 341/51, 341/55, 60, 61, 82, 83, 95, 107; 375/240.03, 375/240.12, 240.16, 240.23, 240.25
See application file for complete search history.

(56) References Cited

U.S. PATENT DOCUMENTS

| | | | | |
|---|---|---|---|---|
| 3,414,670 | A * | 12/1968 | Place | 178/17 R |
| 5,367,335 | A * | 11/1994 | Murakami et al. | 375/240.18 |
| 5,587,710 | A * | 12/1996 | Choo et al. | 341/107 |
| 5,852,469 | A * | 12/1998 | Nagai et al. | 375/240.23 |
| 6,167,084 | A * | 12/2000 | Wang et al. | 375/240.02 |
| 6,275,536 | B1 * | 8/2001 | Chen et al. | 375/240.25 |
| 6,404,814 | B1 * | 6/2002 | Apostolopoulos et al. | 375/240.12 |
| 6,909,745 | B1 * | 6/2005 | Puri et al. | 375/240.01 |
| 6,912,253 | B1 * | 6/2005 | Li et al. | 375/240.12 |
| 7,020,335 | B1 * | 3/2006 | Abousleman | 382/199 |
| 7,151,799 | B2 * | 12/2006 | Kato et al. | 375/240.16 |
| 7,180,944 | B2 * | 2/2007 | Lin et al. | 375/240.16 |
| 7,190,289 | B2 * | 3/2007 | Kobayashi et al. | 341/107 |
| 7,292,165 | B2 * | 11/2007 | Cha et al. | 341/107 |
| 7,298,303 | B2 * | 11/2007 | Kobayashi et al. | 341/107 |
| 7,333,036 | B2 * | 2/2008 | Oh et al. | 341/67 |
| 2003/0033142 | A1 * | 2/2003 | Murashima | 704/219 |
| 2005/0192797 | A1 * | 9/2005 | Makinen | 704/219 |
| 2008/0212677 | A1 * | 9/2008 | Chen et al. | 375/240.16 |

OTHER PUBLICATIONS

P. J. Smith, P. Kabal, M.L. Blostein, "Tandem-Free VoIP Conferencing: A Bridge to Next-Generation Networks"—Proc. IEEE Comm. Magazine, May 2003.

P.J. Smith, P. Kabal, R. Rabipour, "Speaker Selection for Tandem-Free Operation VoIP Conference Bridges"—Proc.IEEE Workshop on Speach Coding, Oct. 2002.

J.D. Tardelli, P.D. Gatewood, E.W. Dreamer, P.A. LaFolette, "The Benefits of Multi-Speaker Conferencing and the Design of Conference Bridge Control Algorithms"—Proc. IEEE Int'l. Conf. Acoustics, Speech, Sig. Processing, Apr. 1993.

* cited by examiner

*Primary Examiner*—Linh V Nguyen (57) ABSTRACT

A method, a component, a system, and a computer program for changing an encoding mode of an encoded data stream from a first encoding mode to a second encoding mode are disclosed. The encoded data stream at the first encoding mode is represented by first encoding parameters. For the encoding mode change the steps of selecting (20) a first set of the first encoding parameters to be used unchanged at the second encoding mode, selecting (30) a second set of the first encoding parameters, changing (40) the second set according to an algorithm being adapted to change the second set to match to the second encoding mode when combined with the first set, and combining (50) the first set and the changed second set for representing the encoded data stream by second encoding parameters at the second encoding mode are performed.

26 Claims, 6 Drawing Sheets

| Bits (MSB-LSB) | Description |
| --- | --- |
| s1 | VAD-flag |
| s2 – s9 | index of 1st ISP subvector |
| s10 – s17 | index of 2nd ISP subvector |
| s18 – s23 | index of 3rd ISP subvector |
| s24 – s30 | index of 4th ISP subvector |
| s31 – s37 | index of 5th ISP subvector |
| s38 – s42 | index of 6th ISP subvector |
| s43 – s47 | index of 7th ISP subvector |
| subframe 1 | |
| s48 – s56 | adaptive codebook index |
| s57 | LTP-filtering-flag |
| s58 – s66 | Codebook index for track 1 |
| s67 – s75 | Codebook index for track 2 |
| s76 – s84 | Codebook index for track 3 |
| s85 – s93 | Codebook index for track 4 |
| s94 – s100 | VQ gain |
| subframe 2 | |
| s101 – s106 | adaptive codebook index (relative) |
| s107 – s150 | same description as s57 – s100 |
| subframe 3 | |
| s151 – s203 | same description as s48 – s100 |
| subframe 4 | |
| s204 – s253 | same description as s101 – s150 |

Fig. 5

Fig. 6 ns sent via a communication network. Examples for terminals are mobile phones but also computing devices capable of communication like Personal Computers (PC) or Laptops. Data streams can be communicated via circuit and/or packet-switched communication networks and are to be understood as a medium carrying the data that is to be transferred from a sending terminal to a receiving terminal. Data streams may be composed of individual packets, frames or messages that can be communicated e.g. in a consecutive manner.
METHOD AND DEVICE FOR CHANGING AN ENCODING MODE OF ENCODED DATA STREAMS

FIELD OF THE INVENTION

The present invention relates to data communication, especially to a method and device for changing an encoded data stream from a first encoding mode to a second encoding mode.

BACKGROUND OF THE INVENTION

Communication of data like e.g. speech audio or video data between terminals is usually performed via encoded data streams sent via a communication network. Examples for terminals are mobile phones but also computing devices capable of communication like Personal Computers (PC) or Laptops. Data streams can be communicated via circuit and/or packet-switched communication networks and are to be understood as a medium carrying the data that is to be transferred from a sending terminal to a receiving terminal. Data streams may be composed of individual packets, frames or messages that can be communicated e.g. in a consecutive manner.

To communicate an encoded data stream from a sending terminal to a receiving terminal, the data stream is first encoded at a certain encoding mode by an encoder of the sending terminal. The encoding by an encoding mode, also known as codec or coding format, is usually performed in order to compress the data and to adapt it to further requirements for communication like e.g. encryption. The encoded data stream is sent via the communication network to the receiving terminal where the received encoded data stream is decoded by a decoder for a further processing by the receiving terminal, e.g. outputting a speech signal or playing out a video signal to a user of the receiving terminal. This end-to-end communication fails if the encoder of the sending terminal and decoder of the receiving terminal are incompatible or if the communication network or parts thereof are at least temporarily not capable of transporting the encoded data stream.

A transcoder is a device that performs a conversion of an encoded data stream encoded at a first encoding mode to a corresponding encoded data stream encoded at a second encoding mode. Thus, in case of incompatible encoder/decoder pairs in the sending/receiving terminals and/or in case of communication network capability problems, one or more transcoders can be installed in the communication network such that the encoded data stream can be transferred via the communication network to the receiving terminal and the receiving terminal is adapted to decode the received encoded data stream.

Communication network capability problems are not unlikely on a radio link in a wireless communication network. The radio link is susceptible to congestion, coverage, or hand-over-problems that all put a limit on the currently available transmission bit rate. Thus, for sending an encoded data stream encoded at an encoding mode of a higher bit-rate to a wireless receiving terminal, a switching to an encoding mode of a lower bit rate can be required in case the transmission capability of a wireless link degrades. End-to-end communication from the receiving terminal to the sending terminal to instruct the sending terminal to switch the encoder to an encoding mode of lower rate is often unwanted or even impossible such that one or more transcoders in the communication network must be employed to convert the encoded data stream encoded at an encoding mode of higher bit rate as received from the sending terminal to an encoded data stream encoded at an encoding mode of lower bit rate such that the receiving terminal can receive the encoded data stream at lower bit rate via the problematic radio link and subsequently decode it.

Transcoding typically means decoding an encoded data stream encoded with a first encoding mode and than encoding the decoded data stream according to a second encoding mode. In the process of transcoding encoding parameters that represent the encoded data stream are processed and altered according to pre-defined, often standardized, algorithms, to form a completely new set of encoding parameters that represent the encoded data stream at the second mode. However, such full transcoding wherein all encoding parameters are newly computed consumes a lot of computational power and introduces delays due to the computational load, which is detrimental especially for real- or quasi-real-time communications like e.g. speech or video or audio play-outs or combinations thereof.

SUMMARY OF THE INVENTION

It is therefore an object of the present invention to provide a method for changing an encoding mode of an encoded data stream from a first encoding mode to a second encoding mode using less computational power while preserving quality level.

This object is achieved by the method as described in claim 1. Furthermore, the invention is embodied in a component according to claim 9, a transcoder according to claim 16, a system according to claim 17, and a computer program according to claim 18. Advantageous embodiments are described in the further claims.

The invention relies on the general inventive concept that a change from a first encoding mode to a second encoding mode is possible without having to process all encoding parameters but only a part thereof thus saving computational power while preserving quality. The invention is therefore principally applicable to all kind of encoding mode changes wherein the first encoding mode and the second encoding mode comprise one or more encoding parameters that can be kept unchanged when changing from the first to the second encoding mode.

In particular, a method for changing an encoding mode of an encoded data stream from a first encoding mode to a second encoding mode is disclosed. The encoded data stream at the first encoding mode can be received from a first terminal. The encoded data stream at the first encoding mode is represented by first encoding parameters. The method comprises several steps that can be executed according to the following order although some of the steps may be exchanged in order or may be performed simultaneously. From the first encoding parameters a first set of encoding parameters that are to be used unchanged at the second encoding mode and further a second set of encoding parameters are selected. The selection can be performed e.g. according to predefined algorithms, mainly for standardized or otherwise predefined relations between the first encoding parameters representing the first encoding mode and second encoding parameters representing the second encoding mode.

The second set of encoding parameters is subsequently changed. This change of the second set can be achieved according to an algorithm being adapted to change the second set to match to the second encoding mode when combined with the first set. The algorithm preferably operates on bit-level. i.e. to change one or more bits of the second set to match to the second encoding mode when combined with the first set.

Finally, the first set and the changed second set are combined thus representing the encoded data stream by second encoding parameters at the second encoding mode. The encoded data stream at the second encoding mode can be then sent to at least one second terminal.

Due to the fact that not all encoding parameters representing the encoded data stream are processed, computational power is saved. Furthermore, processing a subset of the first encoding parameters instead of all of the first encoding parameters improves quality and user perception regarding delays in the encoded data stream as the lower computational load lead to shorter processing times and thus shorter delays with is especially beneficial for real- or quasi-real-time communications. These improvements become even more relevant if the encoding mode of the encoded data stream is changed to multiple encoding modes, e.g. for point-to-multipoint applications. If the first set of the encoding parameters can be also used as input for all or at least more than one of the multiple changed encoding modes even more computational power is saved as the method does not necessarily has to perform steps for selecting possibly one or more further sets of encoding parameters that are to be used unchanged when combined with changed encoding parameters to a new mode.

According to a preferred embodiment, the first encoding mode and the second encoding mode are within the same encoding scheme. Such an encoding scheme comprises at least two encoding modes that each comprise at least one set of encoding parameters that can be left unchanged when changing from a first encoding mode to a second encoding mode, i.e. the first set of encoding parameters representing the encoded data stream encoded at the first encoding mode of the same encoding scheme can be transferred in an unchanged manner to the second encoding mode within the same encoding scheme. The invention is thus directly applicable to any kind of existing or future encoding scheme, wherein encoding modes comprise at least one set of encoding parameters that can be kept unchanged when changing the encoding mode within the encoding scheme. Examples for existing encoding schemes to which the invention is applicable to are Adaptive Multi Rate-Wide Band (AMR-WB), AMR-WB+, or Transform Coded Excitation (TCX).

According to another preferred embodiment, the first encoding mode is associated with a first bit rate and the second encoding mode is associated with a second bit rate. The algorithm, preferably operating on bit-level, is adapted to change bits of the second set to match to the second bit rate of the second encoding mode when combined with the first set. Typically, first encoding mode is higher in bit rate compared to the second encoding mode. Changing from a higher bit rate to a lower bit rate is a typical use case if transmission conditions of the interconnecting communication network gets worse and the invention provides a low computational effort and low delay solution for encoding mode changing. Changing mode from a low bit rate to a higher bit rate or even encoding mode changes at constant bit rate are possible. Encoding mode changes of an encoded data stream upwards or at constant bit level are often unwanted as quality is typically not improved at the higher or same bit rate. which applies however, both to standard encoding mode conversion based on fully decoding and encoding techniques where all encoding mode parameters are newly computed as well as to the present invention, However, the latter still provides the advantages of lower computational effort and lower delay.

According to another preferred embodiment, the encoded data stream comprises encoded speech data. Correspondingly, the first encoding parameters can be first speech encoding parameters and can be processed accordingly. Furthermore, the first set and the changed second can represent the encoded data stream comprising encoded speech data by second encoding parameters represented by second speech encoding parameters.

According to another preferred embodiment, the algorithm uses a target signal for a fixed codebook search, the target signal being derived from at least one of encoding parameter of the first set.

According to another preferred embodiment, the algorithm uses an unweighted synthesis filter to determine the changed second set which improves significantly the quality of the encoded data stream at the second encoding mode.

According to another preferred embodiment, a changing to at least a third encoding mode can be performed. The third encoding mode can be represented by third encoding parameters based on a combination of the first set and the second set can be changed according to a further algorithm being adapted to change the second set to match to the third encoding mode when combined with the first set. Accordingly, encoding mode changing to multiple encoding modes is possible, e.g. for point-to-multipoint applications, with very low computational effort, low delay and low cost.

The invention is furthermore embodied in a component adapted to perform a change of an encoding mode of an encoded data stream from a first encoding mode to a second encoding mode. The encoded data stream at the first encoding mode is represented by first encoding parameters. The component is adapted to select a first set of the first encoding parameters to be used unchanged at the second encoding mode, to select a second set of the first encoding parameters, to change the second set according to an algorithm being adapted to change the second set to match to the second encoding mode when combined with the first set, and to combine the first set and the changed second set for representing the encoded data stream by second encoding parameters at the second encoding mode. Preferably, the component is further adapted to perform any of the further steps of the method according to the invention.

The invention can be further embodied in a transcoder and a system comprising aforementioned component.

The present invention also concerns a computer program comprising portions of software codes in order to implement the method as described above when operated at the component for changing an encoding mode of an encoded data stream from a first encoding mode to a second encoding mode. The computer programs can be stored on a computer readable medium. The computer-readable medium can be a permanent or rewritable memory within said component or located externally. The computer program may be transferred to said component for example via a cable or a wireless link as a sequence of signals.

In particular, the computer program for changing an encoding mode of an encoded data stream from a first encoding mode to a second encoding mode comprises code adapted to select a first set of the first encoding parameters to be used unchanged at the second encoding mode, to select a second set of the first encoding parameters, to change the second set according to an algorithm being adapted to change the second set to match to the second encoding mode when combined with the first set, and to combine the first set and the changed second set for representing the encoded data stream by second encoding parameters at the second encoding mode.

The computer program can further comprise code adapted to process the first encoding mode and the second encoding mode within the same encoding scheme.

The first encoding mode can be associated with a first bit rate and the second encoding mode can be associated with a second bit rate. Thus, the computer program can comprise code adapted to process the algorithm, preferably operating on bit-level, for changing bits of the second set to match to the second bit rate of the second encoding mode when combined with the first set.

According to a further preferred embodiment of the computer program, the encoded data stream comprises encoded speech data and the computer program comprises code adapted to correspondingly process the first encoding parameters being first speech encoding parameters and to correspondingly process the first set and the changed second set for representing the encoded data stream comprising encoded speech data by second encoding parameters represented by second speech encoding parameters.

According to a further preferred embodiment, the computer program comprises code adapted to process the algorithm to use a target signal for a fixed codebook search and further to derive the target signal from at least one of the encoding parameters of the first set.

Furthermore, preferably, the computer program comprises coded adapted to process the algorithm using an unweighted synthesis filter. Alternatively or in addition, the computer program may comprise further code adapted to change the first encoding mode to a third encoding mode represented by third encoding parameters based on a combination of the first set and the second set being changed according to a further algorithm being adapted to change the second set to match to the third encoding mode when combined with the first set.

In the following, detailed embodiments of the present invention shall be described in order to give the skilled person a full and complete understanding. However, these embodiments are illustrative and not intended to be limiting.

DETAILED DESCRIPTION OF THE INVENTION

Figure 1:
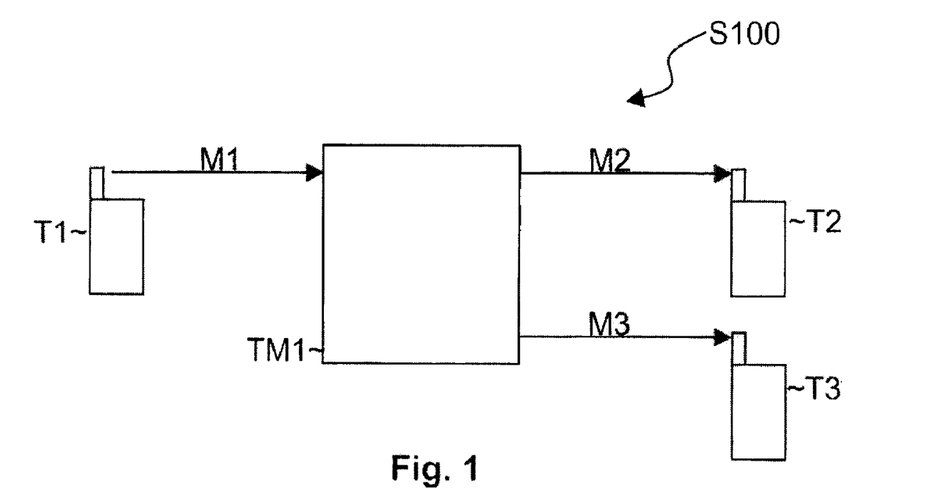
FIG. 1 shows a system according to the invention.

FIG. 1 illustrates a system S100 comprising a first terminal T1 sending an encoded data stream M1 at a first encoding mode to a transcoder TM1 of a communication network. The transcoder TM1 changes the encoding mode of the encoded data stream M1 and outputs an encoded data stream M2 at a second encoding mode which is sent to a second terminal T2. The transcoder TM1 may be adapted to serve more than one terminal with the encoded data stream M2 and/or to change the encoding mode of the encoded data stream M1 to a third encoding mode and to output an encoded data stream M3 at the third encoding mode for sending to a third terminal T3 as depicted as an example for a point-to-multipoint application.

The first terminal T1, the second terminal T2, and the third terminal T3 can be distinct devices as depicted but arrangements wherein at least two terminals share common components, are a common device, or a located on the same platform are also conceivable, e.g. the first terminal T1 and the second terminal T2 being one terminal or terminals T2,T3 being one terminal. The communication network is illustrated in a simplified manner and may comprise further components like e.g. routers, radio network components, databases etc. An example of a communication network wherein the invention can be preferably applied to is a mobile communication network like a Global System for Mobile Communications (GSM), General Packet Radio System (GPRS), Universal Mobile Telecommunication System (UMTS), or a Code Division Multiple Access (CDMA) System like e.g. CDMA2000 or future 4G network although the invention can be applied to fixed communication networks like IP networks or combinations of fixed and wireless communication networks. Terminals T1-T3 can be mobile terminals like mobile phones or smart phones or laptops, fixed line devices like personal computers or audio/video presentation platforms. Combinations of fixed and mobile terminals in a communication network applying the inventive encoding mode changing are also possible.

An encoding mode change may be initiated by one or more messages received at a transcoder, e.g. from a destination terminal T2 receiving the trancoded data stream at the transcoded mode. Alternatively or in addition, equipment belonging to the communication network, e.g. a BSS or a RNC, may signal one or more messages to the transcoder for indicating communication network capability status information. The transcoder can thus change to an encoding mode at a lower bit-rate if current communication network capability is indicated to be incapable of carrying the encoded data stream at a higher bit-rate and can change to an encoding mode of a higher bit-rate if the current communication capability is indicated to be capable of carrying the encoded data stream at an encoding mode of higher bit-rate. An encoding mode change may be initiated alternatively according to a predefined schedule stored e.g. in the transcoder.

Figure 2:
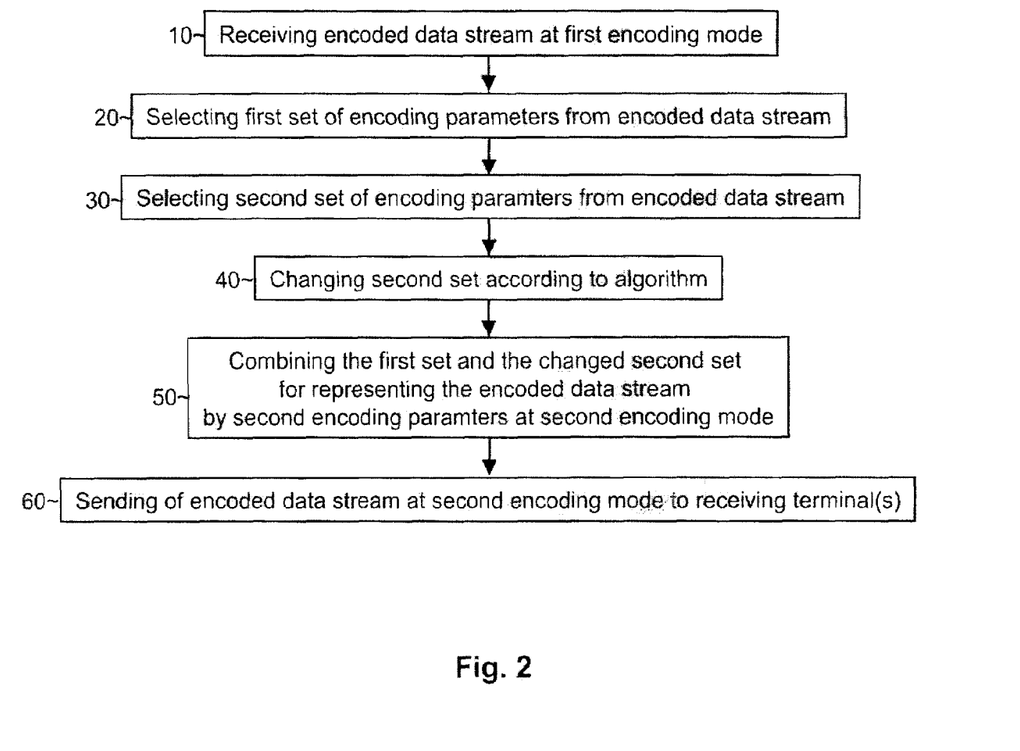
FIG. 2 shows a flow-chart of process steps according to a first embodiment of the invention.

Referring now to FIG. 2 for explaining in more detail the particularities of an encoding mode change, e.g., in a system according to FIG. 1. In a first step 20, the transcoder TM1 receives the encoded data stream M1 at the first encoding mode. Next, the transcoder TM1 selects in steps 20 and 30 a first set and a second set of encoding parameters from the encoded data stream M1. The selected first set can be stored in a database, at least temporarily, to be used later in the composition of the encoded data stream at least at the second encoding mode. The second set is processed in step 40 by an algorithm adapted to change the second set to match to the second encoding mode when combined with the first set. In order to compose the encoded data stream M2 at the second encoding mode, the first set and the changed second set of encoding parameters are combined according to step 50 thus representing the encoded data stream M2 at the second encoding mode. According to step 60, the encoded data stream M2 is sent to the second terminal T2 and, optionally, to further terminals. An encoding mode change to one or more further encoding modes likes the third encoding mode can be performed accordingly.

The invention can be applied to all kind of encoding mode changes wherein the first encoding mode and at least a second encoding mode comprise one or more encoding parameters that can be kept unchanged, e.g. identical, when changing from the first encoding mode to the at least second encoding mode. According to a first variant, the first set of encoding parameters and the second set of encoding parameters can comprise different encoding parameters and thus do not overlap. According to a second variant, the second set can comprise one or more encoding parameters of the first set, i.e. one or more encoding parameters of the first set that are kept unchanged and that contribute in an unchanged manner to the second encoding parameters representing the encoded data stream the second mode can be selected also for the second set and processed accordingly.

Transcoding is thus possible at low computational load and low delay employing an appropriate transcoder. "Transmoding" is a specific embodiment referring to changing the encoding mode of an encoded data stream from a first encoding mode to one or more further encoding modes within the same encoding scheme and the corresponding trancoder is denoted as as "transmoder", i.e. a transcoder that changes encoding mode of a received encoded data stream at a first encoding mode to one or more data streams encoded at one or more further encoding modes within the same encoding scheme.

Figure 3:
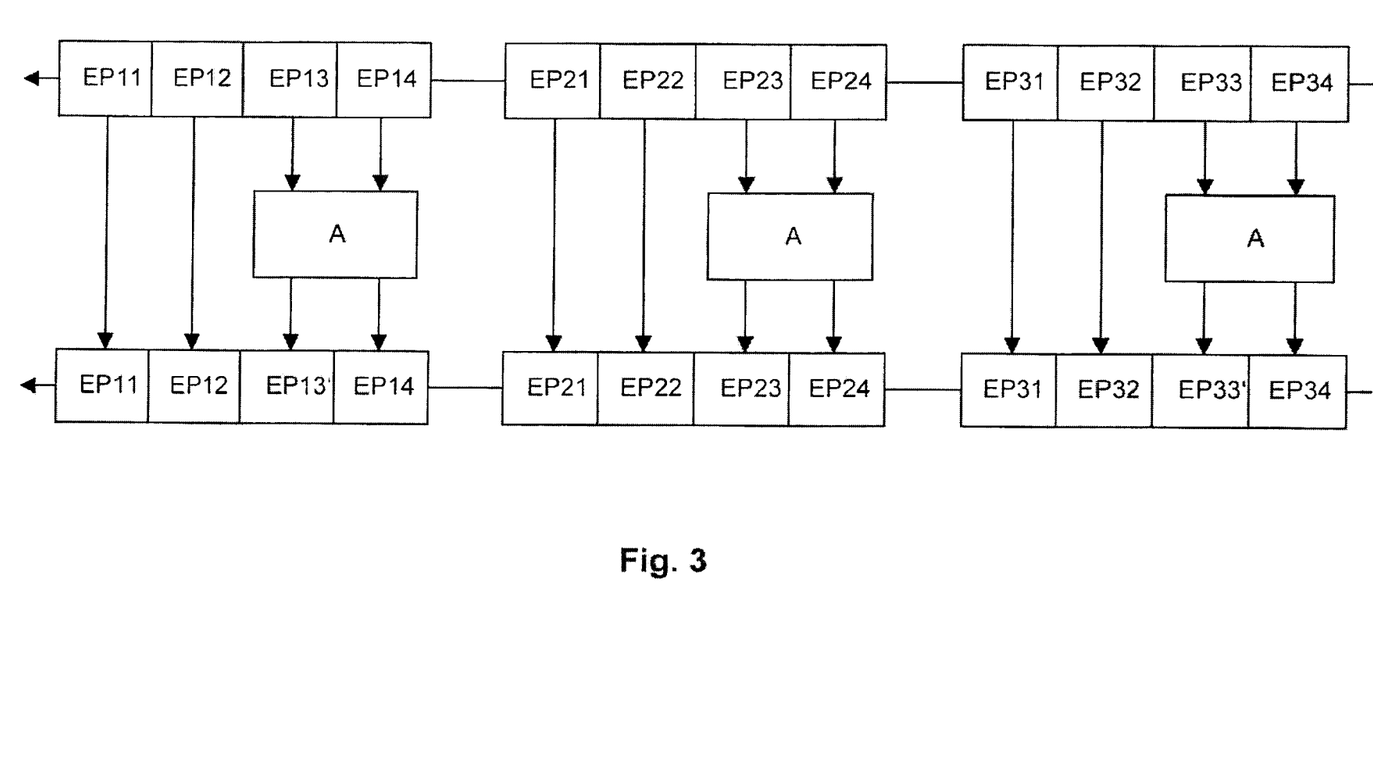
FIG. 3 shows a first encoded data stream and a second encoded data stream and an embodiment for changing encoding mode.

Referring now to FIG. 3 to further illustrate the encoding mode changing according to the invention. FIG. 3 shows in the upper part a first encoded data stream consisting of 3 data packets or frames comprising each 4 encoding parameters, i.e. encoding parameter EP11-EP41 for the first data packet or frame and so on for representing the first encoded data stream at a first encoding mode. Encoding mode changing according to the invention for changing the first encoded data stream at the first encoding mode to a second encoded data stream at a second encoding mode depicted in the lower part of FIG. 3 can be performed by selecting for each of the data packets or frames the first two encoding parameters, i.e. EP11 and EP12 for the first data packet or frame and so on, and to copy them to the corresponding positions of the respective data packet or frame of the second encoded data stream at the second encoding mode. A second set of encoding parameters comprising for each data packet or frame the two last encoding parameters, i.e. EP13 and EP14 and so on, is selected, fed into an algorithm A that changes bits of the second set such that they match to the second encoding mode for inputting the changed second set to the corresponding places of the respective data packet or frame at the second encoding mode, i.e. EP13' and EP14' and so on. Thus, combined unchanged encoding parameters EP11,EP12,EP21,EP22,EP31,EP32 and changed encoding parameters EP13',EP14'EP23',EP24',EP33'EP34' represent three data packets or frames of the second encoded data stream at the second encoding mode as depicted.

It is to be noted that the encoded data streams of FIG. 3 are depicted in a simplified manner as data packets or frames may comprise further information like sequence numbers or routing information that may be transferred changed or unchanged from the first encoded data stream to the second encoded data stream. Furthermore. one or more encoding parameters may be comprised in each set. The ordering of the unchanged and/or changed encoding parameters do not necessarily be the same as depicted in FIG. 3 as encoding modes may differ besides the changed second set in the ordering of the encoding parameters. Furthermore, the number of encoding parameters of the second set that are to be changed do not necessarily have to be identical to the number of encoding parameters of the changed second set but can be larger or lower depending on the particularities of the encoding modes between the change is performed. According to FIG. 3, all encoding parameters of the first encoded data stream are selected to form the first and second set, i.e. the first set for the first data packet or frame comprises encoding parameters EP11 and EP21 and the second set for first data packet or frame comprises the encoding parameters EP31 and EP41. Other arrangements are possible. For example, encoding parameters that are kept unchanged, e.g. EP11 or EP12 an so on, constituting the first set of encoding parameters, can be comprised in the second set that is processed by the algorithm A.

Figure 4:
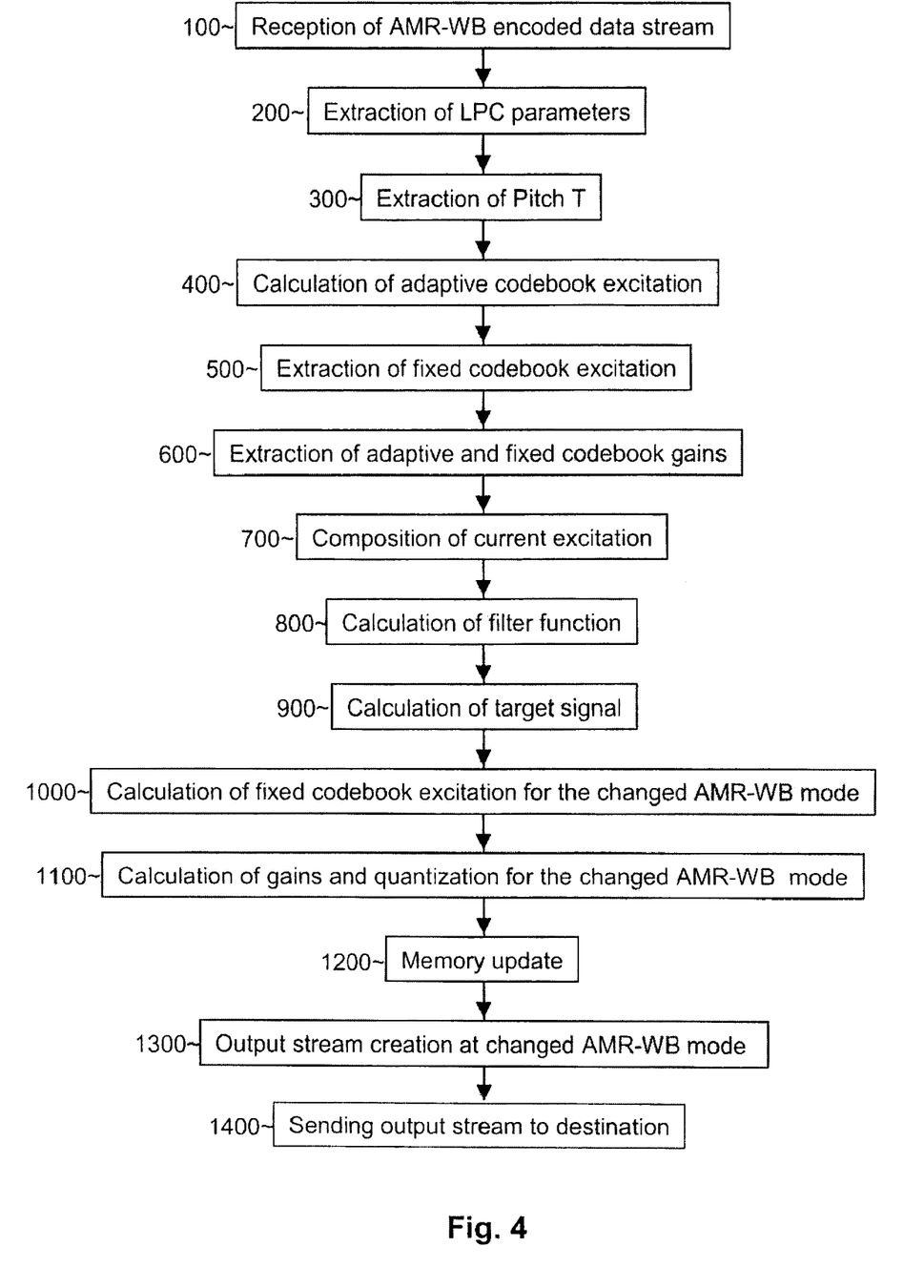
FIG. 4 shows a flow-chart of process steps according to a second embodiment of the invention.
Figure 5:
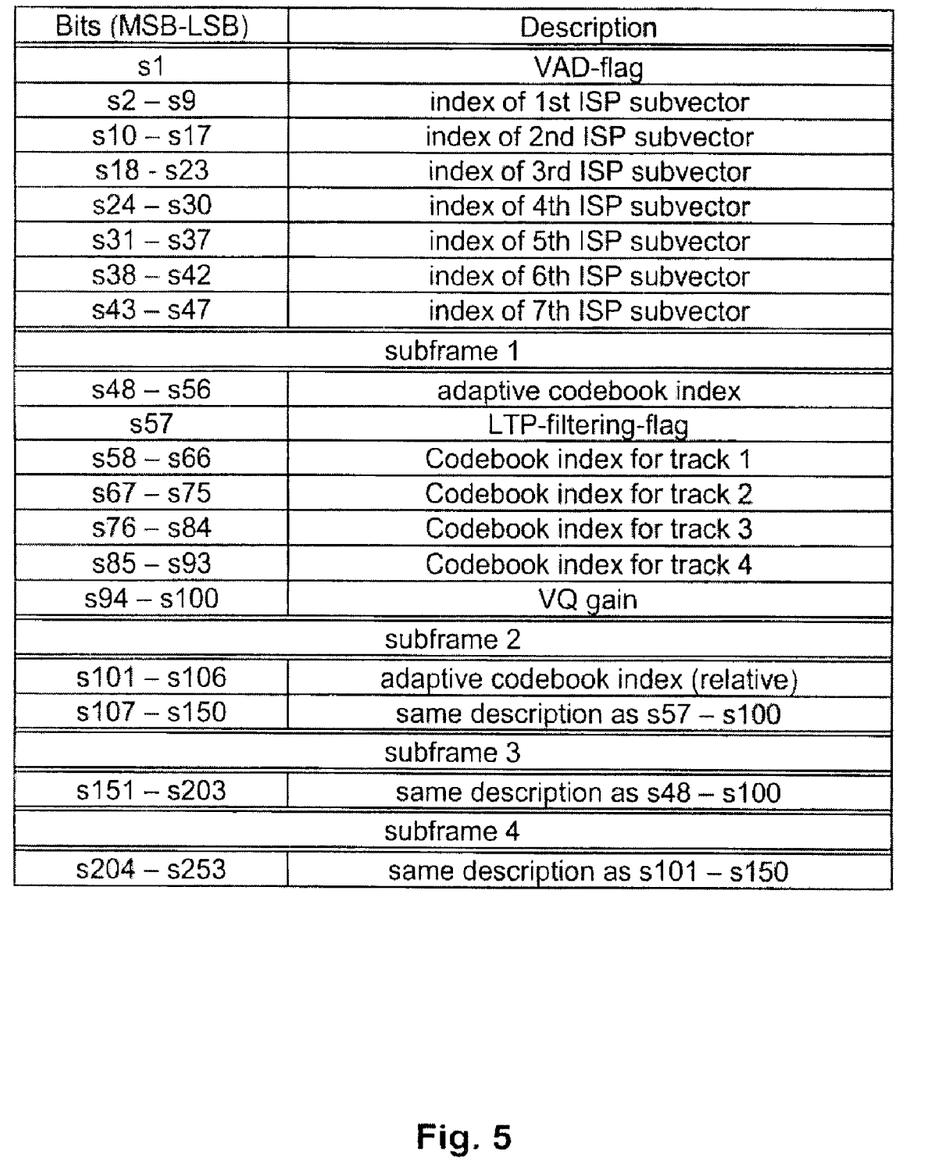
FIG. 5 shows an example for an output of an AMR-WB transmode according to the invention.

A preferred embodiment concerns the transmoding of a data stream encoded according to a first AMR-WB mode to a data stream encoded according to a second AMR-WB mode, which is described in conjunction with FIGS. 4 and 5 in more detail.

AMR-WB is a telephony wideband speech codec specified in $3^{rd}$ Generation Partnership Project (3GPP) Technical Specification (TS) 26.190 Version (V) 5.1.0 (2001-12), which is herein incorporated by reference. Data streams encoded by AMR-WB are represented by three different groups of speech encoding parameters comprising Linear Prediction Coefficients (LPC) parameters, Long-Term Prediction (LTP) parameters, and fixed codebook parameters.

LPC parameters model the short-term correlations among the speech samples and are calculated once per frame (20 ms). LPC parameters can be processed by a simple transformation of the LPC parameters resulting in Immittance Spectral Pair (ISP) parameters, which are used in a simultaneous manner in the following description. LTP parameters model the long-term correlations (pitch) in the speech signal and are calculated once per sub-frame (5 ms). LTP parameters comprise the adaptive codebook gain $g_P$ and pitch. the latter being also known by parameter T. Fixed codebook parameters represent the stochastic excitation that a decoder uses as an input for the LTP and LPC filters in order to synthesize a speech signal. Fixed codebook parameters comprise the fixed codebook gain $g_c$ and the fixed codebook vector c(n).

The AMR-WB codec consists of nine source encoding modes with bit rates of 6.60, 12.65, 14.25, 15.85, 18.25, 19.85. 23.05, 23.85 kbit/s corresponding to a numbering of 0 to 8, respectively. All nine encoding modes encode the speech into frames of 20 ms. The bit allocation of the individual AMR-WB encoding modes can be found in Tab. 1 and 12a-12i of 3GPP TS 26.190 V 5.1.0 (2001-12) being incorporated by reference. One difference among the encoding modes resides in the amount of bits used to encode the different groups of encoding parameters. In particular the encoding modes 2 to 8 (12.65 to 23.85 kbit/s) use the same encoding algorithms and amount of bits to encode LPC (46 bits) and LTP (34 bits) parameters, so that the data encoded at those rates have identical respective LPC and LTP parameters, but differ in the amount and arrangements of bits of the respective fixed algebraic codebook parameters. Thus, a data stream encoded by any of the AMR-WB encoding modes 2-8 have identical respective LPC and LTP parameters but differ in FCB parameters.

A preferred embodiment for an encoding mode change for AMR-WB modes 2-8 is described in conjunction with FIG. 4. In this embodiment, the terms transmoding and transmoder are used to denote the process of transcoding within the same (AMR-WB) encoding scheme and to denote a device that is capable to perform an encoding mode change within the same (AMR-WB) encoding scheme, respectively.

The method starts with the reception of an encoded AMR-WB data stream being encoded at one of the AMR-WB encoding modes 2-8 at a transmoder in step 100. Multiple steps can be performed according to standard 3GPP TS 26.190 V 5.1.0 (2001-12), which eases the implementation.

References to sections or subsections below are meant to refer to this particular standard and are thus incorporated by reference. An index "enc" is used to indicate those LPC, LTP, and fixed codebook parameters that can be obtained from the encoded data stream encoded at a first AMR-WB mode. The corresponding LPC, LTP, and fixed codebook parameters of the encoded data stream encoded at a second, changed AMR-WB mode do not carry this index. As LPC and LTP parameters are kept unchanged in the following example, no reference to $LPC_{enc}$ and $LTP_{enc}$ is made but LPC and LTP, respectively, are used instead.

According to step 200, the LPC parameters are extracted from the received encoded stream. This extraction can be performed according to 3GPP TS 26.190 V 5.1.0 (2001-12) section 6.1 being incorporated by reference and comprises the sub-steps of ISF dequantization, ISF to ISP conversion, ISP parameter interpolation, and the conversion from interpolated ISP parameters into LPC parameter coefficients The ISF dequantization is the inverse of the quantization steps described in detail in subsection 5.2.5. The ISF to ISP conversion $q_i=\cos(\omega_i)$ with i=0 . . . 15 and $q_i$ being the ISPs and $\omega_i$ the ISFs is described in detail in subsection 5.2.3, the ISP parameter interpolation can be performed according to subsection 5.2.6, and the conversion from interpolated ISP parameters into LPC parameter $a_0, a_1, \ldots a_{15}$ constituting the filter $$\hat{A}(z) = 1 + \sum_{i=0}^{15} a_1 \cdot z^i, i = 0, \ldots, 15$$

can be performed according to subsection 5.2.4.

According to step 300 the integer and integral part of LTP parameter Pitch T are extracted form the encoded data stream received in step 100. Next, the calculation of the adaptive codebook excitation $v_{enc}(n)$ according to T and excitation signal $u_{enc}(n)$ is performed in step 400. Subsequently, according to step 500, the fixed codebook excitation $c_{enc}(n)$ is extracted from the encoded data stream and according to step 600, the adaptive and fixed codebook gains, $g_{P\_enc}$ and $g_{C\_enc}$, respectively, are extracted from the encoded data stream encoded at the first encoding mode. Next (step 700), $u_{enc}(n)$ representing the decoded excitation, i.e. the excitation of the encoded data stream at the input first encoding mode, can be composed according to $u_{enc}(n)=g_{P\_enc} V_{enc}(n)+g_{C\_enc} C_{enc}(n)$. Steps 200-700 may be performed according to section 6.1.

In step 800, a filter function is calculated. According to a preferred embodiment am unweighted or some-times called de-weighted synthesis filter is used which results in improved speech quality when compared to the weighted synthesis filter h(n) according to section 5.5. $\tilde{h}(n)$ represents the impulse response of the unweighted synthesis filter which can be calculated by:

$$\tilde{h}(n) = \frac{1}{\hat{A}(z)} \cdot H_{de\_emph}(z),$$

with $$\frac{1}{\hat{A}(z)} = \frac{1}{1 + \sum_{i=0}^{15} a_i \cdot z^i} \text{ and}$$

$$H_{de\_emph}(z) = \frac{1}{1 - 0.68 \cdot z^{-1}}$$

for considering de-emphasis to compensate for signal distortions that were introduced during the encoding of the encoded data stream at the first encoding mode.

Step 900 addresses the calculation of a target signal $x_{enc}(n)$ for algebraic codebook search which is preferably calculated based on the unweighted filter $\tilde{h}(n)$ for quality reasons. The target signal $x_{enc}(n)$ is calculated by $x_{enc}(n)=c_{enc}(n)*\tilde{h}(n)$.

Subsequently in step 1000, the fixed codebook excitation for the new encoding mode, i.e. the encoding mode to which the transmoder changes the encoding mode to, is calculated. This calculation is also based on the unweighted filter $\tilde{h}(n)$ for the same quality reasons and comprises following sub-steps SS1001-SS1005:

A convolutional matrix H from $\tilde{h}(n)$ is created (SS1001), which may be performed according to subsection 5.8.3, but replacing h(n) by $\tilde{h}(n)$. Furthermore, a backward filtered target vector $d=x_{enc}^T \cdot H$ is calculated (SS1002) which can be performed according to subsection 5.8.3, where $x_2^T$ and H are used instead of respectively $x_{enc}^T$ and H with index T indicating a transposition. Then, the parameter b(n) is calculated (SS1003) by $$b(n) = \sqrt{\frac{E_d}{E_u}} \cdot u_{enc}(n) + \alpha \cdot d(n),$$

where $$E_d = d^T \cdot d,$$

$$E_u = u_{enc}^T \cdot u_{enc}, \text{ and}$$

scaling factor $\alpha=1$ for AMR-WB encoding modes 2, 3, 4, $\alpha=0.8$ for AMR-WB encoding mode 5, $\alpha=0.75$ for AMR-WB encoding mode 6, and $\alpha=0.5$ for AMR-WB encoding modes 7,8. Both, the decoded excitation $u_{enc}(n)$ and the backwards target filter d(n) were calculated in previous steps and may be retrieved from a storage. It is preferable to calculate parameter b(n) not fully in compliance with subsection 5.8.3 because b(n) depends on the parameter $r_{LTP}(n)$, i.e. the residual signal after long term prediction which calculation would require a full decoding and partial re-encoding of the data stream thus being detrimental to the advantage of the invention of less computational effort. Thus, b(n) can be calculated according to sub-section 5.8.3 but using $u_{enc}(n)$ instead of $r_{LTP}(n)$ and $E_u=u_{enc}^T \cdot u_{enc}$ instead of $E_r=r_{LTP}^T \cdot r_{LTP}$.

According to a further sub-step SS1004 of step 1000, a fixed codebook search can be performed according to subsection 5.8.3 taking into account the previously calculated parameters of SS1001-SS1003, in particular H, d, and b(n) based on the new target signal $x_{enc}(n)$ resulting in vector $c_K$ corresponding to the new fixed codebook parameter c(n).

The method comprises using a new target signal $x_{enc}(n)$, other than $x_2(n)$ according to 3GPP TS 26.190 V 5.1.0 (2001-12). The calculation of $x_{enc}(n)$ is much less computational intensive with respect to $x_2(n)$, as it does not require to decode and re-encode the speech signal. The fixed codebook search algorithm is thus not affected and remains as specified in the standard 3GPP TS 26.190 V 5.1.0 (2001-12).

In a next sub-step SS1005, the fixed codebook excitation, i.e. the encoding of pulse position and signs, is performed which can be performed according to subsection 5.8.2 taking into account parameter c(n) calculated in SS1004.

The method proceeds to step 1100 for the calculation of gains and for quantization. Step 1100 comprises the following sub-steps SS1101-SS1106: According to SS1101, an adaptive codebook excitation v(n) according to T and and u(n) is calculated. u(n) represents the excitation vector produced by the transmoder. u(n) is different from $u_{enc}(n)$ as the latter represent a reference signal for the algorithms implemented in the transmoder (whose output includes u(n)).

calculation (SS1102) of $j(n) = u_{enc}(n) * \tilde{h}(n)$, calculation (SS1103) of $y(n) = v(n) * \tilde{h}(n)$, calculation (SS1104) of $g_P = \dfrac{\sum_{n=0}^{63} j(n)y(n)}{\sum_{n=0}^{63} y(n)y(n)}$ wherein j(n) represents a computational effective substitute of x(n) being used in the standard, whereas y(n) represents the adaptive excitation v(n) after synthesis. Parameters j(n) and y(n) preferably incorporate the preferred unweighted filter $\tilde{h}(n)$, which again is a further step for improving the quality.

According to a further sub-step SS1105, gain $g_C$ is calculated according to section 5.9. Subsequently, according to sub-step SS1106, $g_P$ and $g_C$ are quantized according to section 5.9 resulting in the quantized adaptive and fixed codebook gains $\hat{g}_P$ and $\hat{g}_C$, respectively.

A memory update of both the produced excitation u(n) and the new reference signal $u_{enc}(n)$ according to step 1200 is performed next in order to compute v(n) from u(n) and $v_{enc}(n)$ from $u_{enc}(n)$ in the next frame. The produced excitation u(n) can be calculated according to section 5.10, i.e. u(n)=$\hat{g}_P$v(n)+$\hat{g}_C$c(n) based on parameters v(n), $\hat{g}_C$c(n) calculated in steps SS1106, SS1101, SS1106, SS1004, respectively. The new reference signal $u_{enc}$ can be calculated as described in conjunction with step 700.

For output stream creation at the changed encoding mode, changed and unchanged encoding parameters have to be combined. This can be achieved according to step 1300 by the following sub-steps SS1301-SS1304 for each frame of the output data stream:

LPC bits of the encoded output data stream can be copied from the LPC bits as extracted in step 100 from the input encoded data stream (SS1301). Correspondingly, pitch T resulting from step 300 that can be copied into the encoded output data stream according to sub-step SS1302. The fixed excitation bits c(n) of the encoded output data stream can be copied from SS1005 and the respective gains can be copied from SS1106.

The output encoded data stream encoded at the changed mode can be sent to its destination according to step 1400.

An example for an output of an AMR-WB transmoder is depicted in FIG. 5. Bit s1 indicates that the frame is speech or non-speech, bits s2-s47 representing the LPC parameters, bits s48-s56, s101-106, s151-s159, and s204-209 represent pitch T, bits s57, s107, s160, s210 describe a flag, bits s58-s93, s108-s143, s161-s196, and s211-246 describe c(n), and bits s94-s100, s144-s150, s197-203, and s247-s253 describe the gains $g_P$ and $g_C$.

Thus, according to the preferred embodiment described in conjunction with FIG. 4 for transmoding an encoded data stream encoded at a first one of AMR-WB mode 2-8 to a second one of AMR-WB mode 2-8, the following bits can be kept unchanged, e.g. copied from the corresponding input data stream at the first AMR-WB mode: Bit s1, bits s2-s47 representing the LPC parameters, bits s48-s56. s101-106, s151-s159, and s204-209 representing pitch T, and bits s57, s107, s160, s210 describing the flag. Bits s58-s93, s108-s143, s161-s196, and s211-246 describing c(n), and bits s94-s100, s144-s150, s197-203, and s247-s253 describing the gains $g_P$ and $g_C$ are changed as described by the change algorithm described in conjunction with FIG. 4.

Both, encoding mode up-switching, i.e. switching from an encoding mode of lower number to a higher number encoding mode, as well as encoding mode down-switching is possible for AMR-WB encoding modes 2-8. In case of a (hypothetical) conversion to the same encoding number LPC, LTP and fixed code book parameters of the input encoded data stream are comprised in the first set and can be copied to the second encoding parameters while the second set of encoding parameters are empty, e.g. not selected, or discarded by the algorithm. Compared to full transmoding, i.e. fully decoding and encoding an encoded data stream of a first one of AMR-WB mode 2-8 represented by linear prediction coefficient LPC1, long-term prediction LTP1 and fixed codebook FCB1 parameters wherein all LPC1, LTP1, and FCB1 parameters are processed according to the standard to form a completely new set of encoding parameters LPC2, LTP2, FCB2 for representing the output encoded data stream at a second AMR-WB mode. the benefits according the invention are tremendous computational power savings and low delay. These benefits clearly outbalance effects on speech quality being negligibly hearable.

Further computational power can be saved when keeping gain $g_P$ and/or gain $g_C$ unchanged. According to this embodiment, also the bits s94-100, s144-150, s197-203, and s247-s253 may be identical for input and output encoded data stream. However, the drop in hearable speech quality is now more remarkable but maybe acceptable in case of low computational resources, e.g. cost optimized transmoders with low processing power, for point-to-multipoint transmoding to many destinations, mode-to-multimode transmoding, or combinations thereof. An example for mode-to-multimode transmoding is to convert an input data stream encoded at AMR-WB mode 8 to encoded data streams encoded at AMR-WB modes 7 and 5.

Figure 6:
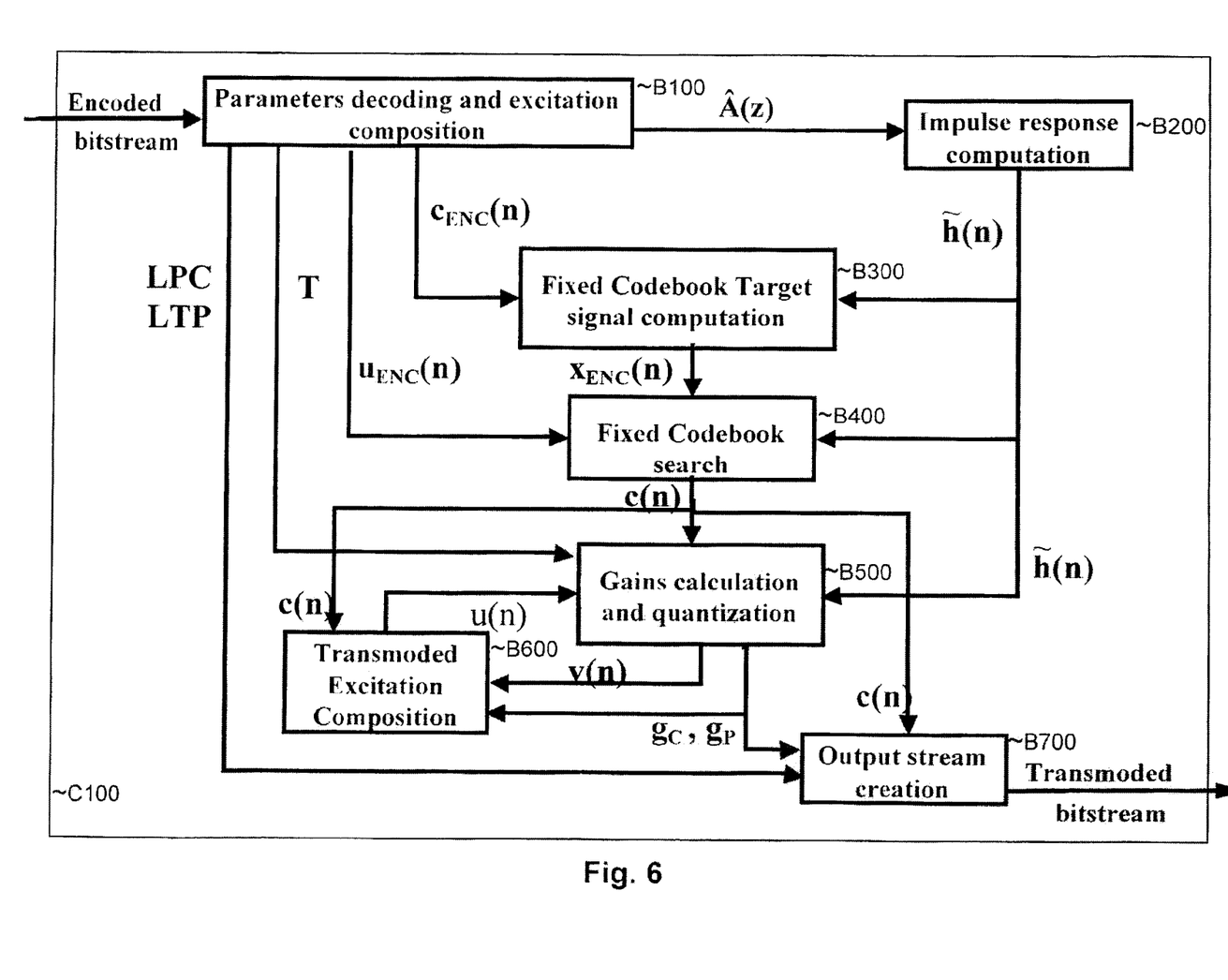
FIG. 6 shows a component for changing encoding mode according to the invention.

Referring now to FIG. 6 showing a transmoding component C100 for changing a first AMR-WB encoded data stream encoded at one of the AMR-WB modes 2-8 (denoted as "Encoded bitstream") to a second encoded data stream encoded at a second one of the AMR-WB modes 2-8 (denoted as "Transmoded bitstream"). The component is sub-devided in several sub-components B100-B700 being associated by arrows that show the flow of information elements from one sub-component to another. The naming of the sub-components, the information elements and their notation refer to the description of FIG. 4 for illustrating a possible distribution of the steps according to FIG. 4 over the sub-components B100-B700. The sub-components can be realized as discrete hardware components or software modules operating on one or more processing units or combinations thereof.

Figure 7A:
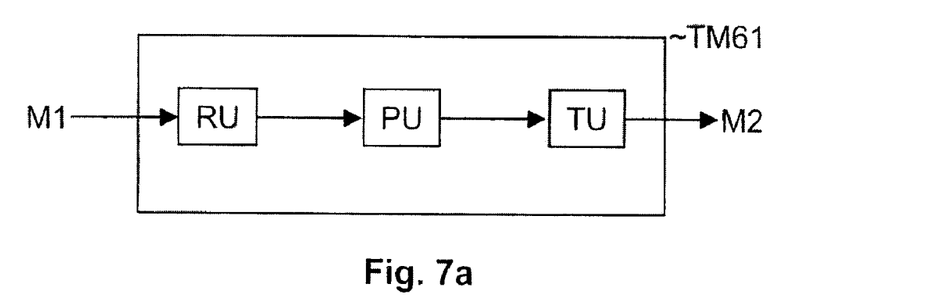
FIG. 7a shows a first embodiment of a transcoder.

FIG. 7a shows a transcoder TM61 comprising a receiving unit RU for receiving a first encoded data stream M1 encoded at a first encoding mode, a transmission unit TU for transmitting a second encoded data stream M2 encoded at the second encoding mode, and a processing unit PU adapted to select a first set of encoding parameters that are to be kept unchanged and a second set of encoding parameters that are to be changed, to apply the change algorithm to the second set, and to combine the unchanged and changed set for representing the second data stream M2 encoded at the second encoding mode. The processing unit PU can correspond to the component C100 thus rendering the trancoder TM61 into a transmoder for AMR-WB mode conversion.

Figure 7B:
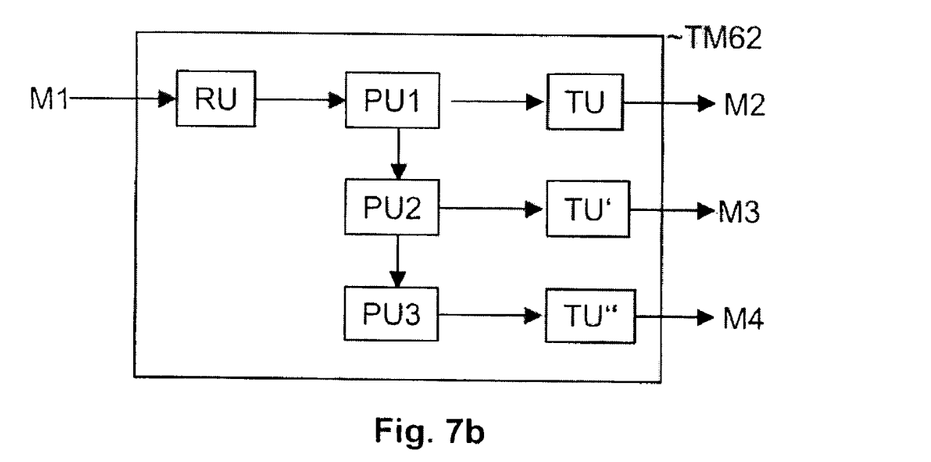
FIG. 7b shows a second embodiment of a transcoder.

FIG. 7b shows a point-to-multipoint transcoder which comprises in addition to FIG. 7a further transmission units TU' and TU" for transmitting a third data stream M3 encoded at a third encoding mode and for transmitting a fourth encoded data stream M4 encoded at a fourth encoding mode. The processing unit PU1 of FIG. 7b may correspond to the processing unit PU of FIG. 7a with the difference that a further output is provided to the processing unit PU1 to input to the second processing unit PU2 one or more encoding parameters or intermediate computing results that can be re-used at the second processing unit PU2. Thus the second processing unit PU2 may be simplified compared to the first processing unit PU1 as less steps are to be carried out and further computing power may be saved, e.g. a selection of the first and second set of encoding parameters may be performed at the first processing unit PU1 and the two sets may be provided in a format that at least the first set can be directly combined into the encoded data stream M3. A corresponding may apply to the relation of processing units PU2 and PU3. Alternatively or in addition, the first processing unit PU1 may have a connection to the third processing unit PU3 for a corresponding data transfer for optimizing computer power consumption by optimized data sharing. Alternatively, the individual processing units may not be connected but operate independently and each being connected to the receiving unit for inputting the encoded data stream into the respective processing unit for respective encoding mode change and outputting to the respective transmission unit.

As explained already before, for point-to-point transmoding tremendous computational power savings at prevailed quality can be achieved. However, for point-to-multipoint transcoding or transmoding, the positive effects of computational power savings do not simply and linearly scale with the number of encoding mode changes and/or the number of receiving terminals as further computational power can be saved by intelligent data sharing within the transcoder or the transmoder as described e.g. in conjunction with FIG. 7b). Point-to-multipoint transcoding and/or transmoding can be preferably applied to any kind of phone or video-conferencing, streaming or broadcasting applications with more than two receiving terminals.

The invention claimed is:

1. A method for changing an encoding mode of an encoded data stream from a first encoding mode to a second encoding mode, the encoded data stream at the first encoding mode being represented by first encoding parameters, the method comprising the steps of
   selecting a first set of the first encoding parameters to be used unchanged at the second encoding mode,
   selecting a second set of the first encoding parameters,
   changing the second set according to an algorithm being adapted to change the second set to match to the second encoding mode when combined with the first set the algorithm using a target signal for a fixed codebook search, the target signal being derived from at least one of the encoding parameters of the first set, and
   Combining the first set and the changed second set for representing the encoded data stream by second encoding parameters at the second encoding mode.

2. The method according to claim 1, further comprising the steps of receiving the encoded data stream at the first encoding mode from a first terminal and sending the encoded data stream at the second encoding mode to at least one second terminal.

3. The method according to claim 1, wherein the first encoding mode and the second encoding mode are within the same encoding scheme.

4. The method according to claim 1, wherein the first encoding mode is associated with a first bit rate and the second encoding mode is associated with a second bit rate and the algorithm is adapted to change bits of the second set to match to the second bit rate of the second encoding mode when combined with the first set.

5. The method according to claim 1, wherein the encoded data stream comprises encoded speech data.

6. The method according to claim 1, wherein the algorithm uses an unweighted synthesis filter.

7. The method according to claim 1, further comprising the step of changing a third encoding mode represented by third encoding parameters based on a combination of the first set and the second set being changed according to a further algorithm being adapted to change the second set to match to the third encoding mode when combined with the first set.

8. A component for changing an encoding mode of an encoded data stream from a first encoding mode to a second encoding mode, the encoded data stream at the first encoding mode being represented by first encoding parameters, the component being adapted
   to select a first set of the first encoding parameters to be used unchanged at the second encoding mode,
   to select a second set of the first encoding parameters,
   to change the second set according to an algorithm being adapted to change the second set to match to the second encoding mode when combined with the first set, wherein the algorithm uses a target signal for a fixed codebook search, the target signal being derived from at least one of the encoding parameters of the first set, and
   to combine the first set and the changed second set for representing the encoded data stream by second encoding parameters at the second encoding mode.

9. The component according to claim 8, wherein the first encoding mode and the second encoding mode are within the same encoding scheme.

10. The component according to claim 8, wherein the first encoding mode is associated with a first bit rate and the second encoding mode is associated with a second bit rate and the component is adapted to process the algorithm changing bits of the second set to match to the second bit rate of the second encoding mode when combined with the first set.

11. The component according to claim 8, wherein the encoded data stream comprises encoded speech data.

12. The component according to claim 8, wherein the component is adapted to process the algorithm using an unweighted synthesis filter.

13. The component according to claim 8, wherein the component is further adapted to change the first encoding mode to a third encoding mode represented by third encoding parameters based on a combination of the first set and the second set being changed according to a further algorithm being adapted to change the second set to match to the third encoding mode when combined with the first set.

14. A transcoder comprising a receiving unit, at least one transmission unit, and at least one component, wherein the receiving unit is adapted to receive the encoded data stream at the first encoding mode and the at least one transmission unit is adapted to transmit the encoded data stream encoded at the second mode and/or the third encoding mode, and the component being adapted to select a first set of the first encoding parameters to be used unchanged at the second encoding mode, to select a second set of the first encoding parameters, to change the second set according to an algorithm being adapted to change the second set to match to the second encoding mode when combined with the first set, the algorithm using a target signal for a fixed codebook search, the target signal being derived from at least one of the encoding parameters of the first set, and to combine the first set and the changed second set for representing the encoded data stream by second encoding parameters at the second encoding mode.

15. The transcoder according to claim 14, wherein the first encoding mode and the second encoding mode are within the same encoding scheme.

16. The transcoder according to claim 14, wherein the first encoding mode is associated with a first bit rate and the second encoding mode is associated with a second bit rate and the component is adapted to process the algorithm changing bits of the second set to match to the second bit rate of the second encoding mode when combined with the first set.

17. The transcoder according to claim 14, wherein the encoded data stream comprises encoded speech data.

18. A system comprising a first terminal, at least one second terminal, and a transcoder, wherein the receiving unit of the transcoder is adapted to receive the encoded data stream at a first encoding mode from the first terminal and an at least one transmission unit of the transcoder is adapted to transmit the encoded data stream encoded at the second mode and/or the third encoding mode to the at least one second terminal and the transcoder comprising at least one component, the component being adapted to select a first set of the first encoding parameters to be used unchanged at the second encoding mode, to select a second set of the first encoding parameters, to change the second set according to an algorithm being adapted to change the second set to match to the second encoding mode when combined with the first set, the algorithm using a target signal for a fixed codebook search, the target signal being derived from at least one of the encoding parameters of the first set, and to combine the first set and the changed second set for representing the encoded data stream by second encoding parameters at the second encoding mode.

19. The system according to claim 18, wherein the component is adapted to process the algorithm using an unweighted synthesis filter.

20. The system according to claim 18, wherein the component is further adapted to change the first encoding mode to a third encoding mode represented by third encoding parameters based on a combination of the first set and the second set being changed according to a further algorithm being adapted to change the second set to match to the third encoding mode when combined with the first set.

21. The system according to claim 18, wherein the first encoding mode and the second encoding mode are within the same encoding scheme.

22. The system according to claim 18, wherein the first encoding mode is associated with a first bit rate and the second encoding mode is associated with a second bit rate and the component is adapted to process the algorithm changing bits of the second set to match to the second bit rate of the second encoding mode when combined with the first set.

23. The system according to claim 18, wherein the encoded data stream comprises encoded speech data.

24. The system according to claim 18, wherein the component is adapted to process the algorithm to use a target signal for a fixed codebook search, and the component is adapted to derive the target signal from at least one of the encoding parameters of the first set.

25. The system according to claim 18, wherein the component is adapted to process the algorithm using an unweighted synthesis filter.

26. The system according to claim 18, wherein the component is further adapted to change the first encoding mode to a third encoding mode represented by third encoding parameters based on a combination of the first set and the second set being changed according to a further algorithm being adapted to change the second set to match to the third encoding mode when combined with the first set.

* * * * *